United States Patent
Kameo et al.

(10) Patent No.: US 8,658,739 B2
(45) Date of Patent: Feb. 25, 2014

(54) POLYOLEFIN-BASED RESIN COMPOSITION AND MOLDED ARTICLE

(75) Inventors: Koji Kameo, Ichihara (JP); Mitsuyoshi Shimano, Kimitsu (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/394,873

(22) PCT Filed: Sep. 9, 2010

(86) PCT No.: PCT/JP2010/066002
§ 371 (c)(1),
(2), (4) Date: Apr. 3, 2012

(87) PCT Pub. No.: WO2011/030922
PCT Pub. Date: Mar. 17, 2011

(65) Prior Publication Data
US 2012/0184679 A1    Jul. 19, 2012

(30) Foreign Application Priority Data

Sep. 11, 2009  (JP) ................................ 2009-210148

(51) Int. Cl.
*C08L 67/00* (2006.01)
*C08L 19/00* (2006.01)
*C08L 23/20* (2006.01)
*C08F 210/16* (2006.01)

(52) U.S. Cl.
USPC ........................... 525/190; 525/166; 525/185

(58) Field of Classification Search
USPC ......................... 525/166, 187, 190
See application file for complete search history.

(56) References Cited

U.S. PATENT DOCUMENTS

| 2010/0003882 A1 | 1/2010 | Sumi et al. |
| 2010/0104883 A1 | 4/2010 | Watanabe et al. |
| 2010/0280194 A1* | 11/2010 | Miyake et al. ............. 525/92 L |

FOREIGN PATENT DOCUMENTS

| JP | 6-263892 A | 9/1994 |
| JP | 8-134283 A | 5/1996 |
| JP | 2006-77063 A | 3/2006 |
| JP | 2007-277444 A | 10/2007 |
| JP | 2008-222865 A | 9/2008 |
| WO | WO 2008/078802 A1 | 7/2008 |
| WO | WO 2008/126359 A1 | 10/2008 |
| WO | WO 2009/078375 A1 | 6/2009 |
| WO | WO 2009/078376 A1 | 6/2009 |

OTHER PUBLICATIONS

Chinese Office Action dated Nov. 22, 2012 from the Chinese Patent Office issued in Chinese Patent Application No. 201080039467.7.
Chinese Office Action dated Aug. 8, 2013 from the Chinese Patent Office issued in Chinese Patent Application No. 201080039467.7.

* cited by examiner

*Primary Examiner* — Fred M Teskin
(74) *Attorney, Agent, or Firm* — Sughrue Mion, PLLC

(57) ABSTRACT

Provided is a polyolefin-based resin composition comprising from 30 to 90% by mass of a polyolefin resin (A), from 1 to 50% by mass of an aliphatic polyester-based resin (B), from 1 to 40% by mass of an ethylene-octene rubber (C) having a melt flow rates being higher than 3 g/10 minutes and not higher than 40 g/10 minutes, and from 0.01 to 20% by mass of an epoxy group-containing ethylene-based polymers (D); molded articles obtainable by molding the composition is superior in tensile elongation and impact resistance.

4 Claims, No Drawings ary methods has been  being studied.

POLYOLEFIN-BASED RESIN COMPOSITION AND MOLDED ARTICLE

TECHNICAL FIELD

The present invention relates to a polyolefin-based resin composition and a molded article obtainable by molding the polyolefin-based resin composition.

BACKGROUND ART

Recently, resins to be produced from plant-derived raw materials, such as polylactic acid and polybutylene succinate, have attracted attention in view of the problem of exhaustion of petroleum resources. However, since plant-derived resins are low in mechanical strength, their use in combination with polyolefin resins has been being studied.

For example, JP 2007-326961 A has disclosed a resin composition that comprises a polyester resin (A) comprising an aliphatic polyester as a primary component, a polyolefin-based resin (B), and a polyolefin-based resin (C) having an ester-formable functional group.

On the other hand, JP 2008-038142 A has disclosed a resin composition comprising a polylactic acid-based resin (A), a polyolefin-based resin (B), and a compatibilizer (C).

However, the resin compositions disclosed in the patent documents are required to be improved in tensile elongation and impact resistance of molded articles obtained therefrom.

DISCLOSURE OF THE INVENTION

In view of the above problems, the object of the present invention is to obtain a composition that comprises a fatty acid polyester-based resin, such as a polylactic acid, and a polyolefin-based resin and that affords a molded article superior in tensile elongation and impact resistance.

The present invention provides a polyolefin-based resin composition comprising:
from 30 to 90% by mass of a polyolefin resin (A),
from 1 to 50% by mass of an aliphatic polyester-based resin (B),
from 1 to 40% by mass of an ethylene-octene rubber (C) having a melt flow rates being higher than 3 g/10 minutes and not higher than 40 g/10 minutes, and
from 0.01 to 20% by mass of an epoxy group-containing ethylene-based polymers (D),
wherein the sum total of the contents of the polyolefin resin (A), the aliphatic polyester-based resin (B), the ethylene-octene rubber (C), and the epoxy group-containing ethylene-based polymers (D) is 100% by mass, and it also provides a molded article obtainable by molding this polyolefin-based resin composition.

According to the present invention, it becomes possible to produce molded articles superior in tensile elongation and impact resistance.

Mode for Carrying Out the Invention

The polyolefin-based resin composition according to the present invention comprises a polyolefin-based resin (A) (hereinafter also referred to as component (A)), an aliphatic polyester-based resin (B) (hereinafter also referred to as component (B)), an ethylene-octene rubber (C) having a melt flow rate being higher than 3 g/10 minutes and not higher than 40 g/10 minutes (hereinafter also referred to as component (C)), and an ethylene-based polymer (D) containing an epoxy group (hereinafter also referred to as component (D)). Hereinafter, the term "polyolefin-based resin composition" is sometimes referred to only as "resin composition."

[Polyolefin-Based Resin (A)]

The polyolefin-based resin (A) to be used in the present invention includes an olefin homopolymer having a crystal region in at least apart thereof and a copolymer of two or more kinds of olefin having a crystal region in at least a part thereof. Examples thereof include a polyethylene resin, a polypropylene resin, and a polybutene resin. Among these, a polypropylene resin is preferred. As such polyolefin resin (A), a single resin may be used or alternatively two or more resins may used together.

The polyethylene resin to be used in the present invention is an ethylene homopolymer or an ethylene-α-olefin copolymer having an ethylene unit content of 50% by mass or more; ethylene-propylene copolymers and ethylene-octene copolymers are included in said polypropylene resin and said ethylene octene rubber, respectively, and both shall be defined not to be included in said polyethylene resin.

Specific examples of α-olefins to constitute ethylene-α-olefin copolymers include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, and 1-dodecene. Especially, 1-butene, 1-pentene, and 1-hexene are preferred. The number of the carbon atoms of the α-olefin to constitute a polyethylene resin is preferably from 4 to 12, more preferably from 4 to 6.

The polypropylene resin to be used in the present invention is a propylene homopolymer or a copolymer having a propylene unit content of 50% by mass, examples of which include a propylene-ethylene random copolymer, a propylene-α-olefin random copolymer, a propylene-ethylene-α-olefin copolymer, and a copolymer composed of a "propylene homopolymer component (hereinafter also referred to as polymer component (I))" and a "copolymer component of propylene with one or more comonomers selected from the group consisting of ethylene and/or α-olefins having 4 or more carbon atoms (hereinafter also referred to as copolymer component (II))".

Specific examples of the α-olefin which constitutes the polypropylene resin include 1-butene, 1-pentene, 1-hexene, 4-methyl-1-pentene, and 1-decene. The number of the carbon atom of the α-olefin constituting the polypropylene resin is preferably from 4 to 20, and more preferably from 4 to 12.

Examples of the propylene-α-olefin random copolymers include propylene-1-butene random copolymers, and propylene-1-hexene random copolymers. Examples of the propylene-ethylene-α-olefin copolymer include propylene-ethylene-1-butene copolymers, and propylene-ethylene-1-hexene copolymers.

In the copolymer composed of the polymer component (I) and the copolymer component (II), examples of the copolymer component (II) include a propylene-ethylene copolymer component, a propylene-ethylene-1-butene copolymer component, a propylene-ethylene-1-hexene copolymer component, a propylene-1-butene copolymer component, and a propylene-1-hexene copolymer component. The content of the copolymer (namely, the monomer other than propylene) in the copolymer component (II) is from 10 to 70% by mass.

Examples of the copolymer composed of the polymer component (I) and the copolymer component (II) include a (propylene)-(propylene-ethylene)copolymer, a (propylene)-(propylene-ethylene-1-butene)copolymer, a (propylene)-(propylene-ethylene-1-hexene)copolymer, a (propylene)-(propylene-1-butene)copolymer, a (propylene)-(propylene-1-hexene)copolymer, a (propylene-ethylene)-(propylene-ethylene)copolymer, a (propylene-ethylene)-(propylene-ethylene-1-butene)copolymer, a (propylene-ethylene)-(propylene-ethylene-1-hexene)copolymer, a (propylene-ethylene)-(propylene-1-butene)copolymer, a (propylene-ethylene)-(propylene-1-hexene)copolymer, a (propylene-1-butene)-(propylene-ethylene)copolymer, a (propylene-1-butene)-(propylene-ethylene-1-butene)copolymer, a (propylene-1-butene)-(propylene-ethylene-1-hexene)copolymer, a (propylene-1-butene)-(propylene-1-butene)copolymer, and a (propylene-1-butene)-(propylene-1-hexene)copolymer.

The polypropylene resin to be used as the polyolefin-based resin (A) is preferably a propylene homopolymer, a propylene-ethylene random copolymer, a propylene-1-butene random copolymer, a propylene-ethylene-1-butene copolymer, or a (propylene)-(propylene-ethylene)copolymer.

An example of the method of producing the polyolefin-based resin (A) is a method of polymerizing an olefin monomer by using a polymerization catalyst. Examples of the polymerization catalyst include Ziegler type catalysts and Ziegler-Natta type catalysts. Further examples include catalyst systems composed of an alkyl aluminoxane and a compound having a cyclopentadienyl ring of a transition metal of Group 4 of the periodic table, or catalyst systems composed of an organoaluminum compound, a compound having a cyclopentadienyl ring of a transition metal of Group 4 of the periodic table, and a compound capable of reacting with the transition metal compound to form an ionic complex, and catalyst systems obtained by making such catalyst systems supported on carriers such as inorganic particles.

Examples of the polymerization method include slurry polymerization and solvent polymerization conducted in an inert hydrocarbon solvent, liquid phase polymerization and vapor phase polymerization conducted in the absence of a solvent, and vapor phase-vapor phase polymerization and liquid phase-vapor phase polymerization in which those are conducted successively. These polymerization methods may be performed in either a batch system or a continuous system. The method may be either a method by which the polyolefin-based resin (A) is produced in a single stage or a method by which the polyolefin-based resin is produced in two or more stages.

Particularly, the production method of the polypropylene-based copolymer composed of the polymer component (I) and the copolymer component (II) is preferably a multistage production method having at least two-stage steps involving a stage of producing the polymer component (I) and a stage of producing the copolymer component (II).

The melt flow rate of the polyolefin-based resin (A) is preferably from 1 g/10 minutes to 100 g/10 minutes, more preferably from 10 g/10 minutes to 80 g/10 minutes, and even more preferably from 30 g/10 minutes to 60 g/10 minutes. The melt flow rate of the polyolefin-based resin (A) is a value measured at 230° C. and a load of 21.2 N according to JIS K7210 in the case of a polypropylene resin or a value measured at 190° C. and a load of 21.2 N in the case of a polyethylene resin.

[Aliphatic Polyester-Based Resin (B)]

The aliphatic polyester-based resin (B) to be used in the present invention includes polyester-based polymers composed of aliphatic hydroxycarboxylic acids and polyester-based polymers composed of aliphatic diols and aliphatic dicarboxylic acids.

Examples of the polyester-based polymer composed of aliphatic hydroxycarboxylic acids include polylactic acid, polyglycolic acid, poly(3-hydroxybutyric acid), poly(4-hydroxybutyric acid), poly(4-hydroxyvaleric acid), and polycaprolactone. Examples of the polyester-based polymers composed of aliphatic diols and aliphatic dicarboxylic acids include polyester carbonate, polyethylene succinate, polybutylene succinate, polyhexamethylene succinate, polyethylene adipate, polybutylene adipate, polyhexamethylene adipate, polybutylene succinate adipate, polyethylene oxalate, polybutylene oxalate, polyhexamethylene oxalate, polyethylene sebacate, and polybutylene sebacate.

Use of poly(α-hydroxy acid) such as polylactic acid and polyglycolic acid is preferred and use of polylactic acid is particularly preferred.

As to the aliphatic polyester-based resin (B), a single kind of aliphatic polyester-based resin may be used or alternatively two or more kinds of aliphatic polyester-based polymers may be used. Examples of such a copolymer include copolymers of lactic acid with a hydroxy acid other than lactic acid. As a blend of aliphatic polyesters, polylactic acid-based resins containing polylactic acid as a base are preferred and examples of other resins to be blended with polylactic acid include aliphatic polyester-based polymers other than polylactic acid. The ratio of the resin other than polylactic acid in such a polylactic acid-based resin is preferably 40% by mass or less and more preferably 30% by mass or less.

In the use of polylactic acid as the aliphatic polyester-based polymer (B), the method of synthesizing the polylactic acid may be either direct polymerization of D-lactic acid or L-lactic acid or ring opening polymerization of D-lactide, L-lactide, or meso-lactide, which are cyclic dimers of lactic acid. The polylactic acid may be composed of only monomer units derived from L-lactic acid or monomer units derived from D-lactic acid or alternatively it may be a copolymer composed of both types of monomer units. A material prepared by blending two or more polylactic acids differing in the ratio of monomer units derived from L-lactic acid to monomer units derived from D-lactic acid in an arbitrary ratio may be used as the aliphatic polyester-based polymer (B).

The melt flow rate of the aliphatic polyester-based polymer (B) at 190° C. and a load of 21.2 N is preferably from 0.5 to 50 g/10 minutes, more preferably from 1 to 30 g/10 minutes, and most preferably from 10 to 20 g/10 minutes.

[Ethylene-octene Rubber (C)]

The ethylene-octene rubber (C) to be used in the present invention is non-crystalline and its melt flow rate measured at 190° C. and a load of 21.2 N is higher than 3 g/10 minutes and up to 40 g/10 minutes. By the use of the ethylene-octene rubber (C) having a melt flow rate falling within such a range, it becomes possible to disperse the rubber well in the polyolefin-based resin (A) and effectively improve the impact resistance as a molded article.

The melt flow rate of the ethylene-octene rubber (C) can be adjusted so as to be within a desired range by appropriately adjusting the degree of polymerization in polymerizing ethylene and octene, which are raw materials.

As to the ethylene-octene rubber (C), it is preferred to use one with a specific gravity of from 0.855 to 0.875. By adjusting the specific gravity to within such a range, it becomes possible to improve the tensile elongation at break and impact resistance of a molded article to be obtained. The specific gravity referred to in the present invention means a value measured in accordance with JIS K7112 "Methods of determining the density and relative density of plastics". The specific gravity can be adjusted to within the range of from 0.855 to 0.875 by appropriately adjusting the ratio of the raw material monomers to be used for the polymerization to the ethylene-octene rubber (C).

As a method for producing the ethylene-octene rubber (C), a conventional polymerization method using a conventional catalyst for olefin polymerization is used. The ethylene-octene rubber (C) is preferably produced by, for example, solution polymerization, slurry polymerization, high-pressure ion polymerization, or vapor phase polymerization using a Ziegler-Natta type catalyst or a complex-based catalyst, such as a metallocene complex and a non-metallocene complex, or bulk polymerization or solution polymerization using a radical initiator. Especially, a method of polymerizing monomers by using a Ziegler-Natta type catalyst or a complex-based catalyst or a method of polymerizing monomer in the presence of a metallocene catalyst is particularly preferred.

[Ethylene-Based Polymer (D) having an Epoxy Group]

The ethylene-based polymer (D) having an epoxy group to be used in the present invention is a copolymer having monomer units having an epoxy group and monomer units derived from ethylene. This copolymer may further have monomer units derived from an α-olefin containing no epoxy groups or vinyl type monomer units having no epoxy groups.

Examples of a monomer that has an epoxy group include α,β-unsaturated glycidyl esters, such as glycidylmethacrylate and glycidyl acrylate, α,β-unsaturated glycidyl ethers, such as allyl glycidyl ether and 2-methyl allyl glycidyl ether. Glycidyl methacrylate is preferred. Specific examples of the copolymer having monomer units having an epoxy group and monomer units derived from ethylene include glycidyl methacrylate-ethylene copolymers (e.g., one with a commercial name of BONDFAST produced by Sumitomo Chemical Co., Ltd.).

Examples of the copolymer of ethylene, a monomer having an epoxy group, and an α-olefin-based copolymer containing no epoxy groups or the copolymer of ethylene, a monomer having an epoxy group, and a vinyl type monomer containing no epoxy groups include glycidyl methacrylate-ethylene-styrene copolymers, glycidyl methacrylate-ethylene-acrylonitrile-styrene copolymers, and glycidyl methacrylate-ethylene-propylene-butene copolymers.

The copolymer of monomers having an epoxy group, ethylene, and an α-olefin containing no epoxy groups or vinyl type monomers containing no epoxy groups may be polyethylene, an ethylene-α-olefin copolymer, or a graft polymer obtained by graft-polymerizing the aforementioned monomers having an epoxy group to hydrogenated or unhydrogenated styrene-conjugated diene type.

The epoxy group-containing ethylene-based polymer (D) may have monomer units derived from monomers other than monomers containing an epoxy group. Examples of such a monomer include unsaturated carboxylic acid esters, such as methyl acrylate, ethyl acrylate, methyl methacrylate, and butyl acrylate, and unsaturated vinyl esters, such as vinyl acetate and vinyl propionate.

In the ethylene-based polymer (D) containing an epoxy-group, the content of the monomer units derived from monomers having an epoxy group is from 0.01% by mass to 30% by mass, and preferably from 0.1% by mass to 20% by mass, wherein the content of all monomer units in the ethylene-based polymer having an epoxy group is 100% by mass. The content of the monomer units derived from monomers having an epoxy group is measured by infrared spectroscopy.

The melt flow rate of the ethylene-based polymer (D) containing an epoxy group is from 0.1 g/10 minutes to 300 g/10 minutes, and preferably from 0.5 g/10 minutes to 80 g/10 minutes. The melt flow rate as referred to herein is measured under conditions including a test load of 21.18 N and a test temperature of 190° C. in accordance with the method provided in JIS K7210 (1995).

The ethylene-based polymer (D) containing an epoxy group can be produced by, for example, a method comprising copolymerizing a monomer having an epoxy group, ethylene, and, according to necessity, other monomers by high-pressure polymerization, solution polymerization, emulsion polymerization, or the like or a method comprising graft-polymerizing a monomer having an epoxy group to an ethylene-based resin.

As described above, the resin composition according to the present invention contains the polyolefin-based resin (A), the aliphatic ester-based polymer (B), the ethylene-octene rubber (C), and the ethylene-based polymer (D) containing an epoxy group. By mixing the ethylene-octene rubber (C) at the time of mixing the polyolefin-based resin (A) and the aliphatic ester-based polymer (B) in the presence of the ethylene-based polymer (D) containing an epoxy group, the resin composition comes to have a structure in which the aliphatic ester-based polymer (B) has been finely dispersed. As a result, the resin composition according to the present invention becomes superior in balance between rigidity and impact resistance.

In particular, it is preferred that the above-described polyolefin-based resin (A), aliphatic ester-based polymer (B), ethylene-octene rubber (C), and ethylene-based polymer (D) containing an epoxy group be blended so that the content of component (A) may become from 30 to 90% by mass, the content of component (B) may become from 1 to 50% by mass, the content of component (C) may become from 1 to 40% by mass, and the content of component (D) may become from 0.01 to 20% by mass, where the sum total is 100% by mass.

From the viewpoints of the flexural modulus, heat distortion temperature, impact resistance, and so on of a molded article, the content of component (A) is preferably from 40% by mass to 80% by mass, more preferably from 50% by mass to 70% by mass.

From the viewpoints of the hydrolysis resistance, moldability, and so on of the resin composition, the content of component (B) is preferably from 10% by mass to 50% by mass, more preferably from 20% by mass to 40% by mass.

From the viewpoints of the flexural modulus, heat distortion temperature, impact resistance, and so on of a molded article, the content of component (C) is preferably from 3% by mass to 35% by mass, more preferably from 5% by mass to 30% by mass.

From the viewpoints of the moldability of the resin composition and the flexural modulus, heat distortion temperature, impact resistance, and so on of a molded article, the content of component (D) is preferably from 0.1% by mass to 20% by mass, more preferably from 0.5% by mass to 10% by mass.

By the use of the above-described resin composition according to the present invention, various molded articles can be produced. Such molded articles may be any molded articles, such as injection molded articles, extrusion formed articles, compression molded articles, blow molded articles, expansion molded articles, sheets, films, yarns, and fabrics. More specific examples include automobile parts such as bumpers, radiator grilles, side moldings, garnishes, wheel covers, aero parts, instrument panels, door trims, sheet fabrics, door handles, and floor mats, housings of home electronics, films for product packaging, waterproof sheets, and containers such as bottles. It may be used as the layered article with a multilayered structure produced by hybridization with paper or another polymer sheets or a molded article with a sandwich structure formed by injection molding two or more polymers separately.

Molded articles can be produced by, for example, melting a resin composition according to the present invention and then processing it into a desired shape. Molding methods, such as injection molding, extrusion forming, blow molding, blow film forming, profile extrusion forming, injection blow molding, vacuum pressure molding, and spinning, can be applied. In producing a molded article, it is possible to impart a desired physical property to the molded article by adding an additive to a resin composition. For example, a filler, a plasticizer, a pigment, a stabilizer, an antistatic agent, a UV absorber, an antioxidant, a flame retardant, a release agent, a lubricant, a dye, an antibacterial agent, an end-capping agent, and so on may be added as an additive. The added amount of such an additive is preferably up to 100 parts by mass, more preferably up to 50 parts by mass relative to 100 parts by mass of the resin composition according to the present invention.

The temperature used at the time of melting the resin composition according to the present invention is usually about 180 to about 300° C.

EXAMPLES

The present invention is described in detail below with reference to Examples. Evaluations of properties were performed by the following methods.

(1) Melt Flow Rate

The melt flow rate (hereinafter MFR) of the respective resins used was measured by the method provided in JIS K7210. The measurement load was 21 N. MFR (190° C.) and MFR (230° C.) mean an MFR measured at 190° C. and an MFR measured at 230° C., respectively.

(2) Specific Gravity

The specific gravities of the respective resins used were measured without annealing by using the method provided in JIS K7112.

(3) Content of Monomer Units Derived from glycidyl methacrylate (Unit: % by mass)

The content of monomer units derived from glycidyl methacrylate in component (B) was determined by a method in which an infrared absorption spectrum of a press sheet of the component (B) is measured, the absorbance of the characteristic absorption of the obtained infrared absorption spectrum is corrected by the thickness of the sheet used for the measurement, and the content of monomer units derived from glycidyl methacrylate is determined by a calibration curve method on the basis of the obtained corrected absorbance. A peak of 910 cm$^{-1}$ was used as the characteristic absorption of glycidyl methacrylate.

(4) Tensile Elongation at Break (Unit: %)

In accordance with the method provided in ASTM D638, the tensile elongation at break of a molded article was measured by using an auto tensile tester ATM-P manufactured by ORIENTEC Co., Ltd. A 3.2 mm thick specimen molded by injection molding was used. The tensile speed was 20 mm/minutes and the elongation of the gauge length (initial value=50 mm) at the time of breaking was evaluated. The measurement was carried out at 23° C.

(5) Izod Impact Strength (Unit: kJ/m$^2$)

In accordance with the method provided in JIS K7110, the Izod impact strength of a molded article was measured by using an Izod impact testing machine manufactured by Toyo Seiki Seisaku-sho, Ltd. In the measurement was used a 3.2-mm thick specimen which was molded by injection molding and V-notched after the molding. The measurement was carried out at a temperature of 23° C.

The materials used in the Examples are as follows.

(A) Polyolefin-Based Resin

Component (A-1): "NOBLEN (registered trademark) X101" produced by Sumitomo Chemical Co., Ltd. (propylene homopolymer, MFR (230° C.)=40 g/10 minutes)

Component (A-2): "NOBLEN (registered trademark) WPX5343" produced by Sumitomo Chemical Co., Ltd. (mixture of propylene homopolymer and ethylene-propylene copolymer, MFR (230° C.)=50 g/10 minutes)

(B) Aliphatic Ester-Based Polymer

Component (B) "TERRAMAC (registered trademark) TE-2000C" produced by Unitika Ltd. (polylactic acid resin, MFR (230° C.)=40 g/10 minutes)

(C) Ethylene-octene Rubber

Component (C-1) : "ENGAGE (registered trademark) EG8200" produced by DuPont Dow Elastomers (ethylene-octene rubber, MFR (190° C.)=5 g/10 minutes, specific gravity: 0.870)

Component (C-2) : "ENGAGE (registered trademark) EG8137" produced by DuPont Dow Elastomers (ethylene-octene rubber, MFR (190° C.)=15 g/10 minutes, specific gravity: 0.864)

Component (C-3) : "ENGAGE (registered trademark) EG8407" produced by DuPont Dow Elastomers (ethylene-octene rubber, MFR (190° C.)=30 g/10 minutes, specific gravity: 0.870)

Component (C-4): Mixture prepared by kneading component (C-1) and the following component (C-5) in a ratio of 50/50 (MFR (190° C.)=2 g/10 minutes, specific gravity: 0.864)

Component (C-5) : "ENGAGE (registered trademark) EG8842" produced by DuPont Dow Elastomers (ethylene-octene rubber, MFR (190° C.)=1 g/10 minutes, specific gravity: 0.858)

Component (C-6) : "ENGAGE (registered trademark) EG8100" produced by DuPont Dow Elastomers (ethylene-octene rubber, MFR (190° C.)=1 g/10 minutes, specific gravity: 0.870)

Component (C-7): "ENGAGE (registered trademark) EG8003" produced by DuPont Dow Elastomers (ethylene-octene rubber, MFR (190° C.)=1 g/10 minutes, specific gravity: 0.885)

Component (C-8) : "ESPLENE SPO (registered trademark) ESPLENE SPO (registered trademark) V0111" produced by Sumitomo Chemical Co., Ltd. (ethylene-propylene rubber, MFR (190° C.)=1 g/10 minutes, specific gravity: 0.870)

(D) Ethylene-Based Polymer having an Epoxy Group

"BONDFAST (registered trademark) E" produced by Sumitomo Chemical Co., Ltd. (ethylene-glycidyl methacrylate copolymer, MFR (190° C.)=3 g/10 minutes, content of monomer units derived from glycidyl methacrylate=12% by mass)

Examples 1 to 4 and Comparative Examples 1 to 6

In each of the Examples, component (A) through component (D) prepared in the above-described way were charged in the prescribed ratio given in Table 1 into a 50-mmϕ kneading and extruding machine that has two screws (TEM50A, manufactured by Toshiba Machine Co., Ltd.), followed by kneading. The cylinder temperature was set at 190° C., and pellets of a resin composition were obtained at an extrusion rate of 50 kg/hr and a screw rotation rate of 200 rpm. The pellets of the resin composition obtained were subjected to injection molding by using a Sycap 110/50 injection molding machine manufactured by Sumitomo Heavy Industries, Ltd., at a molding temperature of 200° C., a mold cooling temperature of 30° C., an injection time of 15 seconds, and a cooling time of 30 seconds. As to the shape of the molded specimen, the tensile specimen was ASTM No. 1 dumbbell and the Izod specimen was a shape of 64×12.7×3.2 (mm) obtained by bisected the flexural specimen along its longitudinal direction.

Using the specimens obtained, a test of tensile elongation at break and an Izod impact strength test were carried out in the above-described ways. The results are shown below.

TABLE 1

|  | Example |  |  |  |
|---|---|---|---|---|
|  | 1 | 2 | 3 | 4 |
| (A-1) Component | 15 | 15 | 15 | 0 |
| (A-2) Component | 40 | 40 | 40 | 55 |
| (B) Component | 25 | 25 | 25 | 25 |
| (C-1) Component | 15 | 0 | 0 | 0 |
| (C-2) Component | 0 | 15 | 0 | 15 |
| (C-3) Component | 0 | 0 | 15 | 0 |
| (C-4) Component | 0 | 0 | 0 | 0 |
| (C-5) Component | 0 | 0 | 0 | 0 |
| (C-6) Component | 0 | 0 | 0 | 0 |
| (C-7) Component | 0 | 0 | 0 | 0 |
| (C-8) Component | 0 | 0 | 0 | 0 |
| (D) Component | 5 | 5 | 5 | 5 |
| Tensile elongation at break (%) | 672 | 660 | 606 | 590 |
| Izod impact strength (kJ/m$^2$) | 30 | 25 | 22 | 20 |

|  | Comparative Example |  |  |  |  |  |
|---|---|---|---|---|---|---|
|  | 1 | 2 | 3 | 4 | 5 | 6 |
| (A-1) Component | 15 | 15 | 15 | 15 | 15 | 30 |
| (A-2) Component | 40 | 40 | 40 | 40 | 40 | 40 |
| (B) Component | 25 | 25 | 25 | 25 | 25 | 25 |
| (C-1) Component | 0 | 0 | 0 | 0 | 0 | 0 |
| (C-2) Component | 0 | 0 | 0 | 0 | 0 | 0 |
| (C-3) Component | 0 | 0 | 0 | 0 | 0 | 0 |
| (C-4) Component | 15 | 0 | 0 | 0 | 0 | 0 |
| (C-5) Component | 0 | 15 | 0 | 0 | 0 | 0 |
| (C-6) Component | 0 | 0 | 15 | 0 | 0 | 0 |
| (C-7) Component | 0 | 0 | 0 | 15 | 0 | 0 |
| (C-8) Component | 0 | 0 | 0 | 0 | 15 | 0 |
| (D) Component | 5 | 5 | 5 | 5 | 5 | 5 |
| Tensile elongation at break (%) | 590 | 450 | 625 | 462 | 15 | 20 |
| Izod impact strength (kJ/m$^2$) | 17 | 14 | 11 | 9 | 7 | 4 |

INDUSTRIAL APPLICABILITY

According to the present invention, it becomes possible to produce molded articles superior in tensile elongation and impact resistance.

The invention claimed is:

1. A polyolefin-based resin composition comprising:
   from 30 to 90% by mass of a polyolefin resin (A),
   from 1 to 50% by mass of an aliphatic polyester-based resin (B),
   from 1 to 40% by mass of an ethylene-octene rubber (C) having a melt flow rate being from 5 g/10 minutes to 30 g/10 minutes, the melt flow rate of the ethylene-octene rubber (C) being measured at 190° C. and a load of 21.2 N, and
   from 0.01 to 20% by mass of an epoxy group-containing ethylene-based polymer (D), wherein the sum total of the contents of the polyolefin resin (A), the aliphatic polyester-based resin (B), the ethylene-octene rubber (C), and the epoxy group-containing ethylene-based polymer (D) is 100% by mass.

2. The polyolefin-based resin composition according to claim 1, wherein the ethylene-octene rubber (C) has a specific gravity of from 0.855 to 0.875.

3. A molded article obtainable by molding the polyolefin-based resin composition according to claim 1.

4. A molded article obtainable by molding the polyolefin-based resin composition according to claim 2.

* * * * *